United States Patent
Blankenship

[15] 3,682,012
[45] Aug. 8, 1972

[54] V-BELT AND METHOD OF MAKING SAME
[72] Inventor: James C. Blankenship, Akron, Ohio
[73] Assignee: The B. F. Goodrich Company, New York, N.Y.
[22] Filed: Feb. 25, 1971
[21] Appl. No.: 118,831

[52] U.S. Cl..................................74/231 R, 156/139
[51] Int. Cl.............................F16g 1/00, B29h 7/22
[58] Field of Search.....74/234, 237, 231 R; 156/139, 156/137

[56] References Cited
UNITED STATES PATENTS 3,083,582  4/1963  Wheeler..................74/234 X
3,521,500  7/1970  Goudin et al............74/231 R

*Primary Examiner*—Leonard H. Gerin
*Attorney*—W. A. Shira, Jr. and Joseph Januszkiewicz

[57] ABSTRACT

An endless V-belt of elastomeric material having a plurality of longitudinally spaced preferably T-shaped lug members embedded in the belt with portions of the lug extending radially outwardly of the belt and being adapted for attachment thereto. The method of making the belt includes applying layers of elastomeric material and reinforcing cords over a building drum to form an inverted belt carcass and then forming apertures in the carcass for receiving the lug members before completing fabrication and vulcanizing of the belt.

6 Claims, 7 Drawing Figures

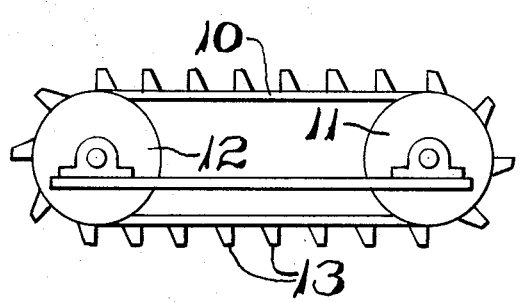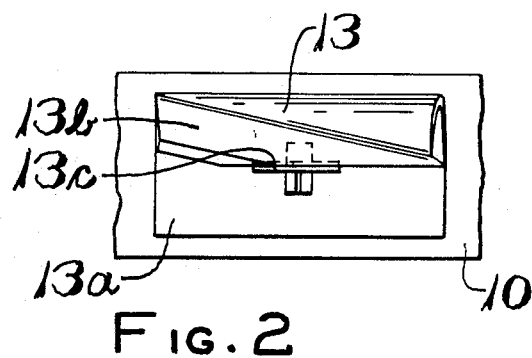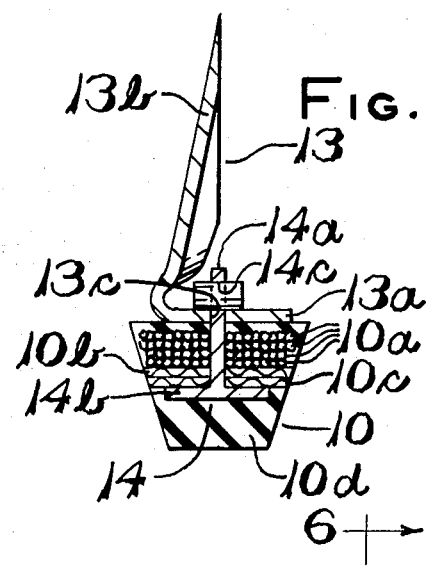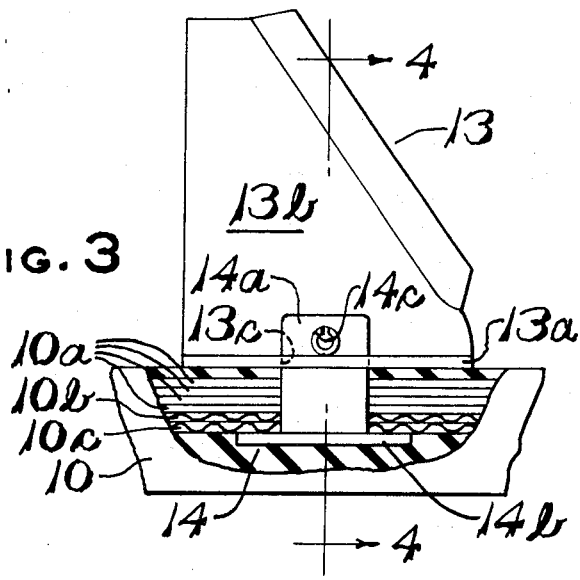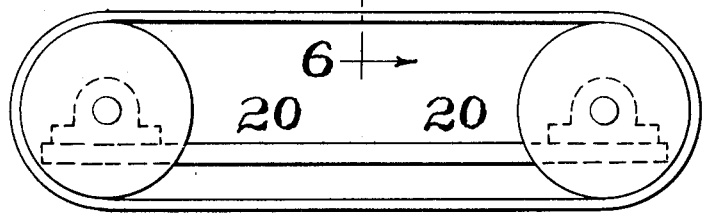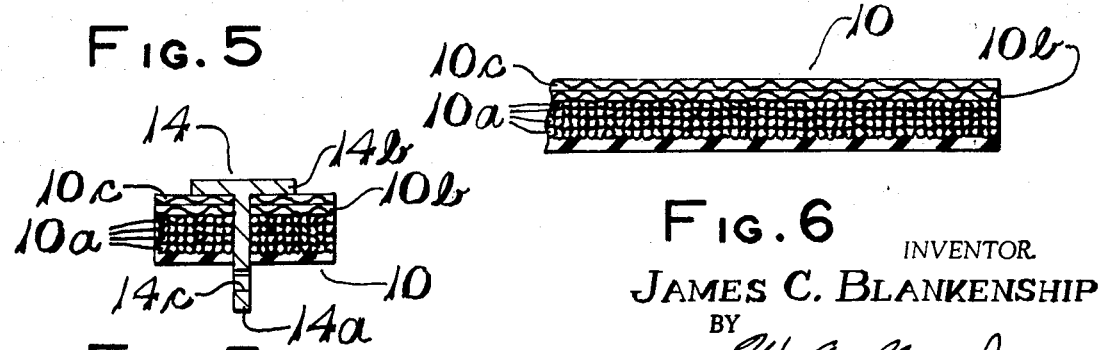
INVENTOR
JAMES C. BLANKENSHIP
BY
W. A. Shira, Jr.
ATTY.

V-BELT AND METHOD OF MAKING SAME

BACKGROUND OF THE INVENTION

In the design and manufacture of high-speed cutting machines such as chain saws and rotary mowers, it has long been desired to provide a resilient and shock absorbent means for attachment of the cutting members in order to permit increased cutter running speeds. In present devices of the above-described type, cutting members or teeth are usually attached to a rigid rotating member or to an inextensible link chain which travels over spaced pulleys or a guide track member. As the running speed of the chain or rotary member is increased, oscillation and impulses generated from the teeth striking rigid objects impart sudden and severe loads to the mechanism thereby limiting the speeds at which the teeth may be driven. If the chain or rotary member is driven at excessive speeds, upon the cutting member encountering a rigid object or upon generation of sufficiently large amplitude vibration, it is not uncommon for teeth to be broken from their connection.

Attempts have been made, generally unsuccessfully, to rivet or similarly attach cutting teeth to the outer periphery of power transmission belts, for example V-belts, to enable design of an orbiting cutter belt having the smoother power transmission characteristics and shock absorbing qualities of V-belts as contrasted to link chain cutter drives. A belt or link chain is preferred to a rotary cutter in that a rotary cutter makes design of a compact cutter assembly quite difficult. However, it has been found quite difficult to provide a belt cutter assembly capable of retaining the cutting members in attachment to the belt during high speed service. As the running speed of the belt is increased, the inertial forces arising from the cutting teeth passing over the pulleys and impact loads from their high speed encounter with foreign objects as well as with the material to be severed, have often caused the teeth to be wrenched loose from their attachment to the V-belt. Therefore, it has been desirable to find a satisfactory means for attachment of cutting members to a resilient belt in such a manner so as to provide retention of the cutting teeth on the belt at high belt speeds.

SUMMARY OF THE PRESENT INVENTION

The present invention provides a solution to the above-described problem by providing an improved V-belt construction having a plurality of lug members spaced longitudinally thereon with retaining portions of the lug member embedded in the belt and attachment portions projecting from the outer periphery of the belt with the apertures formed thereon for attachment. The lug members are preferably T-shaped with the retaining portions embedded transversely in the belt radially inwardly of the belt tension reinforcement members and with the attachment portions of the lugs extending through the tension reinforcement and projecting from the outer surface of the belt.

In the novel method of making a belt of the present invention, the belt carcass is formed by applying appropriate layers of uncured elastomer cover tension reinforcement members and fabric upon one or a pair of spaced building drums, trimming the belt carcass to the desired shape and forming apertures through the carcass of the belt in longitudinally spaced arrangement. The lug members are then inserted through the apertures with the shank of the lug extending beyond one face of the belt carcass and the base of the lugs resting on the other face of the carcass. The lug-inserted carcass disposed in inside-out configuration is then completed by addition of the elastomeric base layer of the belt. It is turned right side out and vulcanized.

BRIEF DESCRIPTION OF THE DRAWINGS

FIG. 1 is a side elevation view of the belt of the present invention as it appears trained over pulleys, one of which may be driven, with cutting members attached to the outer periphery of the belt;

FIG. 2 is a plan view of an enlarged segmented portion of the belt showing in detail the connection of a single cutting member on the belt;

FIG. 3 is a side elevation view of FIG. 2 with portions of the belt broken away to show the lug member embedded in the belt;

FIG. 4 is an enlarged cross-sectional view taken along section indicating lines 4—4 of FIG. 3 and further illustrates the details of the belt construction and the lug member embedded in the belt;

FIG. 5 is a side elevation view of an uncured belt carcass as it appears on the building drums;

FIG. 6 is an enlarged sectional view taken along section indicating lines 6—6 of FIG. 5; and FIG. 7 is a view similar to FIG. 6 of a portion of the belt having the lug members received in apertures formed in the belt carcass.

DETAILED DESCRIPTION

Referring now to FIG. 1, the belt 10 is shown as it runs over a pair of spaced pulleys 11 and 12 with a plurality of longitudinally spaced cutting teeth 13 attached to the outer periphery of the belt such that the belt and teeth provide a cutter assembly adapted for high speed use.

Referring now to FIG. 2, one of the cutting teeth 13 is shown mounted on the belt and having a base portion 13a substantially at right angles to a blade portion 13b with the base portion contacting, in superposed relationship, the outer periphery of the belt and the blade portion 13b extending outwardly therefrom. The base portion 13a has an aperture 13c formed therethrough which aperture is received over an attachment means on the belt.

Referring now to FIG. 2 and 3, the attachment means, in the preferred form, is illustrated as a lug member 14 having a first portion or shank 14a extending from the outer periphery of the belt and through the aperture 13c of the base of the cutting tooth. The first portion 14a of the lug member has an aperture 14c formed therethrough with a roll pin received therein for retaining the base portion 13a of the cutting tooth against the outer periphery of the belt, thus preventing inadvertent removal of the tooth from attachment to the belt.

Referring now to FIGS. 3 and 4, the lug member 14 is shown in the preferred embodiment as a T-shaped member having a second or base portion 14b formed at substantially right angles to the previously described first or shank portion 14a and embedded in the belt radially inwardly from the tension reinforcement layer of the belt.

The belt 10 has a plurality of tension resisting means which may comprise one or more layers of tension members, preferably textile cords, 10a adjacent the radially outer surface thereof and preferably at least two layers of square woven fabric 10b and 10c provided radially inwardly of the layers of tension cords 10a. The first or shank portion of each lug member 14 is received through an aperture formed in the layers of tension members 10a and fabric layers 10b and 10c so that the shank of the lug member penetrates through the belt carcass and projects beyond the outer surface of the belt. The second or base portion 14b of the lug member, which is formed generally at right angles to the first portion of the lug to form preferably a T-shape for the lug, contacts the radially inner surface of the radially inner square woven fabric and the said second or base portion 14b of the lug is larger than the aperture formed in the belt so as to prevent removal of the lug from the belt in a direction radially outwardly of the belt. A layer of elastic material 10d is provided radially inwardly of the lug member and the layers of square woven fabric to provide a base layer for the belt. In the preferred embodiment, illustrated in FIGS. 2, 3 and 4, the attachment lug member 14 thus comprises a T-shaped lug with the transverse base portion thereof embedded in the belt and the attachment or shank portion extending radially outwardly from the belt and adapted for attachment of a cutting member thereto.

In the method of the present invention, the belt is fabricated in an inverted, or inside-out, fashion by first applying one or more layers of uncured elastomer cover tension cords 10a over at least one building drum, and preferably two spaced drums 20, as shown in FIG. 5. At least two layers of square woven fabric 10b and 10c are then applied in superposed relationship, as illustrated in FIG. 6, to form a rudimentary belt carcass which is then removed from the building drum. A plurality of longitudinally spaced apertures are then formed through the belt carcass, each of which is adapted for receiving one of the lug members 14. The first or shank portion 14a of one of the lug members 14 is then inserted from the woven fabric side of the carcass into each of the apertures formed in the belt carcass with the said attachment or shank portion 14a extending through the aperture in the belt and projecting beyond the surface of the belt tension cord layers and with the base portion 14b of the member resting on the exposed surface of the square woven fabric. A layer of elastomeric material 10d is then applied over the base, or second portion 14b of the lug, and over the fabric layer 10c in superposed relationship to form the completed carcass. The belt is then turned right-side-out with the first portion 14a of the lug members extending from the outer periphery thereof.

The assembled belt is then prepared for vulcanizing, preferably by tensioning over a pair of spaced pulleys. The portions of the belt carcass intermediate the pulleys are received between the mold cavity platens of a press and subsequently vulcanized therebetween under heat and pressure. In the presently preferred practice of the invention, the mold platen of the press adjacent the outer periphery of the belt has a longitudinal groove formed therein with the first portion 14a of the lug members received therein thus permitting the lug members to slide through the platen as the belt is advanced sequentially for separate segmental curing.

The present invention thus provides a belt construction having a plurality of T-shaped lug members embedded therein each having portions extending from the outer periphery of the belt adapted to receive an attachment thereto. The cutter is attached to the belt by providing a slot in the base region of the cutter, with the shank of the lug member received therethrough and the cutter secured thereon by appropriate fasteners. The belt is initially fabricated, as mentioned above, in preferably an inside-out manner, but alternatively, the carcass fabrication may be initiated in a right-side-out manner if desired, the choice being determined generally by whichever procedure is more convenient.

Those having ordinary skill in the art will be able to make modifications and adaptations of the invention but the invention is limited only by the spirit and scope of the following claims.

I claim:

1. An endless power transmission belt formed of vulcanized elastomeric material and having a V-shape in transverse section comprising:
   a. at least one reinforcement layer embedded in said belt;
   b. a plurality of lug members disposed in longitudinally spaced arrangement along said belt with each of said lug members having a base portion disposed radially inward of said reinforcement layer and a shank portion disposed to extend through said reinforcement and project from the outer periphery of said belt with the shank portion adapted for attachment of a rigid blade means thereto.

2. The belt defined in claim 1, wherein said reinforcement layer includes at least one layer of longitudinally disposed flexible tension members.

3. The belt defined in claim 2, wherein said reinforcement further includes at least one layer of square woven fabric.

4. The belt defined in claim 1, wherein said shank and said base portions of said lug members are arranged in T-shaped configuration.

5. The belt defined in claim 1, wherein said shank portion of each of said lug members has an aperture formed therein for fastening a cutter thereto.

6. The method of making an endless elastomeric power transmission belt of the V-type comprising the steps:
   a. providing at least one building drum;
   b. applying over said drum a plurality of layers of uncured elastomer having at least one layer of reinforcement therein;
   c. forming a plurality of longitudinally spaced apertures through the belt carcass;
   d. providing a plurality of lug members each having a shank portion adapted to interfit the said apertures and having means provided thereon with each of said members further having a base portion larger than said apertures;
   e. inserting the shank portion of one of said lug members through each of said apertures with said fastening means projecting beyond the surface of said tension cord layers and with the said second portion adjacent the said woven fabric; and,
   f. applying a base layer of uncured elastomeric material over the square woven fabric in superposed relationship;

g. forming the belt to a substantially V-shaped cross-section; and,
h. vulcanizing the belt to the said V-shape in a mold.

* * * * *